United States Patent
Weaver (10) Patent No.: US 9,633,751 B2
(45) Date of Patent: Apr. 25, 2017

(54) LIQUID LITHIUM FIRST WALLS FOR ELECTROMAGNETIC CONTROL OF PLASMAS IN FUSION POWER REACTOR ENVIRONMENTS

(75) Inventor: Thomas Lyman Weaver, Webster Groves, MO (US)

(73) Assignee: THE BOEING COMPANY, Chicago, IL (US)

( * ) Notice: Subject to any disclaimer, the term of this patent is extended or adjusted under 35 U.S.C. 154(b) by 1091 days.

(21) Appl. No.: 13/306,643

(22) Filed: Nov. 29, 2011

(65) Prior Publication Data

US 2012/0307951 A1 Dec. 6, 2012

Related U.S. Application Data

(63) Continuation-in-part of application No. 13/078,729, filed on Apr. 1, 2011.

(51) Int. Cl.
G21B 1/13 (2006.01)

(52) U.S. Cl.
CPC .............. *G21B 1/13* (2013.01); *Y02E 30/128* (2013.01)

(58) Field of Classification Search
CPC ..... Y02E 30/138; Y02E 30/128; Y02E 30/14; Y02E 30/122; G21B 1/03; G21B 1/13; G21B 1/057; F28D 2021/0078
USPC ............... 376/100, 133, 136, 142, 146, 150; 165/80.4, 168
See application file for complete search history.

(56) References Cited

U.S. PATENT DOCUMENTS

| | | | |
|---|---|---|---|
| 3,762,992 A | | 10/1973 | Hedstrom |
| 4,330,864 A | * | 5/1982 | Ohyabu .................. 376/133 |
| 4,344,911 A | * | 8/1982 | Maniscalco et al. ......... 376/102 |
| H24 H | * | 2/1986 | Kugel et al. .................. 376/136 |

(Continued)

FOREIGN PATENT DOCUMENTS

| | | |
|---|---|---|
| JP | 60-098526 | 1/1985 |
| JP | 2009-256369 | 5/2009 |
| JP | 2011-6193 | 1/2011 |

OTHER PUBLICATIONS

Majeski ( p. 123 3rd Paragraph; Liquid Metal Walls, Lithium, and Low Recycling Boundary Conditions in Tokamaks, AIP Conference Proceedings, 1237, 122-137 (2010)).*

(Continued)

*Primary Examiner* — Sean P Burke
(74) *Attorney, Agent, or Firm* — Vista IP Law Group LLP; Cynthia A. Dixon, Esq.

(57) ABSTRACT

A method, system, and apparatus are disclosed for liquid lithium first walls for electromagnetic control of plasmas in fusion power reactor environments. In particular, the method involves installing at least one layer of at least one tile on the surface area of the internal walls of the reactor chamber. A portion of the tile(s) facing the interior of the reactor chamber includes a plurality of channels. The method further involves applying an electric charge to the liquid lithium. Further, the method involves circulating the liquid lithium throughout the interior network of the tile(s) to allow for the liquid lithium to flow into the channels and to reach the external surface of the tile(s) that faces the interior of the reactor chamber. In some embodiments, the method also involves installing at least one magnetic coil between the tile(s) and the surface area of the internal walls of the reactor chamber.

14 Claims, 8 Drawing Sheets

(56) References Cited

U.S. PATENT DOCUMENTS

| | | | | |
|---|---|---|---|---|
| 4,578,236 | A * | 3/1986 | Gomei | 376/136 |
| 4,696,781 | A * | 9/1987 | Bourque | 376/136 |
| 4,698,198 | A * | 10/1987 | Gruen | 376/146 |
| 5,182,075 | A * | 1/1993 | Gotoh et al. | 376/150 |
| 6,411,666 | B1 * | 6/2002 | Woolley | 376/136 |
| 6,610,375 | B2 * | 8/2003 | Akiba et al. | 427/585 |
| 6,716,782 | B2 | 4/2004 | Heng et al. | |
| 7,055,781 | B2 | 6/2006 | Behrens et al. | |
| 2010/0038051 | A1 * | 2/2010 | Behrens et al. | 165/41 |

OTHER PUBLICATIONS

R. Kaita, S. Jardin, C. Kessel, R. Majeski, J. Spaleta, R. Woolley, L. Zakharov, B. Nelson, and M. Ulrickson, "Modeling of Spherical Torus Plasmas for Liquid Lithium Wall Experiments", IEEE 2002.

"Current Drive Experiment—Upgrade", Princeton Plasma Physics Laboratory Newsletter, Posted Aug. 26, 2004.

S.I. Krasheninnikov, L.E. Zakharov, and G.V. Pereverzev, "On Lithium Wall and Performance of Magnetic Fusion Device".

S.V. Mirnov, E.A. Azizov, V.A. Evtikhin, V.B. Lazarev, I.E. Lyublinski, A.V. Vertkov, D. Yu Prokhorov, "Experiments with Lithium Limiter on T-11M Tokamak and Applications of the Lithium Capillary-Pore System in Future Fusion Reactor Devices", Plasma Physics and Controlled Fusion vol. 48, pp. 821-837, May 16, 2006.

Majeski, Dick, LRX? (the Lithium RFP eXperiment??!!), PPPL Princeton Plasma Physics Laboratory, ReNeW Them V PPPL Mar. 16-20, 2009 (12 pages).

Extended European Search Report, Application No. 12193470.7-1551 / 2600350, Feb. 19, 2016.

Evtikhin, et al., "Lithium Divertor Concept and Results of Supporting Experiments", Plasma Physics and Controlled Fusion, vol. 44, No. 6, Jun. 2002 (Jun. 2002), pp. 955-977, XP002753999, UK, ISSN: 0741-3335, DOI: 10.1088/0741-3335/44/6/322. (See abstract; p. 956, paragraphs 1-5; p. 960, paragraph 1; p. 961, paragraph 1; p. 972, paragraph 6; figures 20 and 21).

Mirnov, et al., "Plama-wall Interactions and Plasma Behavior in Fusion Devices with Liquid Lithium Plasma Facing Components", Journal of Nuclear Materials, Elsevier BV, NL, vol. 390-391, Jun. 15, 2009 (Jun. 15, 2009), pp. 876-885, XP026109992, ISSN: 0022-3115, DOI: 10.1016/J.JNUCMAT.2009.01.228 [retrieved on Mar. 4, 2009] (See p. 877, paragraph 2-p. 878, paragraph 2.2).

"SLIP—Study of Lithium Infusion in Porous Media", Internet Citation, Feb. 27, 2009 (Feb. 27, 2009), pp. 1-3, XP002677849, Retrieved from the Internet: URL:http://cpmi.illinois.edu/2009/02/27/slip-study-of-lithium-infusion-in-porous-media/ [retrieved on Jun. 14, 2012] (See p. 2, paragraph 1).

Notice of Reasons for Rejection issued Jul. 26, 2016 in Japanese Patent Application No. 2012-259365 (7pages).

\* cited by examiner

LIQUID LITHIUM FIRST WALLS FOR ELECTROMAGNETIC CONTROL OF PLASMAS IN FUSION POWER REACTOR ENVIRONMENTS

CROSS-REFERENCE TO RELATED APPLICATION

This application is a Continuation-In-Part application of, and claims the benefit of U.S. patent application Ser. No. 13/078,729, filed Apr. 1, 2011, which is hereby incorporated by reference in its entirety.

BACKGROUND

The present disclosure relates to electromagnetic control of plasmas in fusion power reactor environments. In particular, it relates to liquid lithium (Li) first walls for electromagnetic control of plasmas in fusion power reactor environments.

SUMMARY

The present disclosure relates to an apparatus, system, and method for liquid lithium first walls for electromagnetic control of plasmas in fusion power reactor environments. In one or more embodiments, a method is disclosed for maintaining liquid lithium on a surface area of internal walls of a reactor chamber. The method involves installing at least one layer of at least one tile on the surface area of the internal walls of the reactor chamber. In one or more embodiments, a portion of the tile(s) facing the interior of the reactor chamber includes a plurality of channels. The method further involves applying an electric charge to the liquid lithium. Also, the method involves flowing the liquid lithium into the tile(s). In addition, the method involves circulating the liquid lithium through an interior network of the tile(s) to allow for the liquid lithium to flow into the channels and to reach the external surface of the tile(s) that faces the interior of the reactor chamber. Further, the method involves outputting the circulated liquid lithium from the tile(s).

As illustrated above, in one or more embodiments, the interior network of the tile(s) and the channels of the tile(s) are manufactured from a high-temperature resistant, porous open-cell material. In at least one embodiment, the high-temperature resistant, porous open-cell material is a ceramic foam or a metal foam, and the channels are hydraulically and electrically separated from one another by solid ceramic strips. In other embodiments, the high-temperature resistant, porous open-cell material is a ceramic foam or a metal foam, and the channels are hydraulically and electrically separated from one another by ceramic foam strips treated with a lithium-blocking, electrically insulating coating.

In at least one embodiment, as illustrated above, the tile(s) is manufactured from a high-temperature resistant, porous open-cell material. In some embodiments, the high-temperature resistant, porous open-cell material is a ceramic foam, and the channels are hydraulically and electrically separated from one another by strips of the ceramic foam that are treated with a lithium-blocking, nonconductive coating.

As illustrated above, in one or more embodiments, the disclosed method further involves installing at least one magnetic coil between the tile(s) and the surface area of the internal walls of the reactor chamber. In at least one embodiment, at least one voltage source is used to provide the electric charge. In one or more embodiments, the reactor chamber is employed in a fusion reactor. In at least one embodiment, at least one tile has an irregular shape. In some embodiments, at least one tile has a regular shape.

In at least one embodiment, as illustrated above, at least one tile contains at least one open cell in the interior of the tile(s), and the liquid lithium is circulated throughout the interior of the tile(s) via the open cell(s). In some embodiments, at least one tile has a constant porosity. In some embodiments, at least one tile has a varied porosity.

As illustrated above, in one or more embodiments, at least one tile includes an input plenum, and the liquid lithium is inputted into the tile(s) via the input plenum. In at least one embodiment, the input plenum is a hollow piece of metal. In some embodiments, at least one tile includes an output plenum, and the liquid lithium is outputted from the tile(s) via the output plenum. In at least one embodiment, the output plenum is a hollow piece of metal. In one or more embodiments, the flow rate of the circulation of the liquid lithium within the interior network of at least one tile is varied over time.

As illustrated above, in one or more embodiments, a system is disclosed for maintaining liquid lithium on a surface area of internal walls of a reactor chamber. The system involves at least one tile, where a portion of the tile(s) facing the interior of the reactor chamber includes a plurality of channels. The system also involves the reactor chamber, where at least one layer of the tile(s) is installed on the surface area of the internal walls of the reactor chamber. In addition, the tile(s) allows for electrically charged liquid lithium to be flowed into the tile(s). Additionally, the tile(s) further allows for the liquid lithium to be circulated throughout an interior network of the tile(s) to allow for the liquid lithium to flow into the channels and to reach an external surface of the tile(s) that faces the interior of the reactor chamber. Also, and the tile(s) further allows for the circulated liquid lithium to be outputted from the tile(s).

In at least one embodiment, as illustrated above, a tile is disclosed for maintaining liquid lithium on a surface area of internal walls of a reactor chamber. The tile is manufactured from a high-temperature resistant, porous open-cell material. The tile includes a plurality of channels. The tile also includes at least one open cell in the interior of the tile for circulating electrically charged liquid lithium within the interior of the tile and the channels of the tile.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for electromagnetic control of plasmas in fusion power reactor environments. Specifically, this system relates to liquid lithium (Li) first walls for electromagnetic control of plasmas in fusion power reactor environments. In particular, the disclosed system uses a high-temperature, high-porosity open-cell material to maintain liquid lithium in a fusion energy reactor, thereby reducing damage to the internal reactor surfaces that have complex shapes. For example, the Boeing Rigid Insulation (BRI) material, which is a porous open-cell ceramic material with a high temperature tolerance and a good material compatibility, may be employed by the disclosed system. In addition, the disclosed system also provides for high-neutron flux exposure for the lithium for purposes of tritium breeding.

BRI material is a porous, ceramic, fiber insulating material that comprises a unique combination of ceramic fibers, which are sintered together to form a low density, highly porous material with very low thermal conductivity. In addition, BRI material exhibits a high tensile strength and an outstanding dimensional stability. In particular, BRI material is manufactured from a combination of silica ($SiO_2$) and alumina ($Al_2O_3$) fibers, and boron-containing powders, which help to aid in the fusion and sintering of the silica and alumina fibers. The preponderance of the insulative capability of the BRI material is provided by the silica fiber and the alumina fiber orientation. The BRI material exhibits very low thermal conductivity, particularly in the through-the-thickness direction. Further details discussing the composition of BRI and the method of producing BRI are disclosed in U.S. Pat. No. 6,716,782, which is expressly incorporated herein by reference.

There are known difficulties in maintaining plasma control in fusion energy reactors. Among them, plasmas can be unstable at high power densities. Liquid lithium is known to help stabilize plasmas in reactor vessels. The plasma consists mostly of positive ions and negative electrons, and its outer sheath, near the reactor walls, is cooler than its core. In the sheath, the ions have a higher probability of acquiring electrons from the plasma and, thus, becoming neutral atoms than do ions in the core. Neutral atoms cannot be confined by magnetic fields, thus neutral atoms have a high probability of crossing the magnetic field that confines the plasma, and hitting the reactor vessel walls. In this process, the neutral atoms carry some energy from the plasma to the walls, thus causing a slight further cooling of the plasma sheath and a slight heating of the walls. In a fusion plasma, most of these neutral atoms are hydrogen, but other materials can be present, such as helium made by the fusion reactions and heavy elements (contaminants) that can be spalled off the reactor structure by accidental plasma impingement on the structure. If the walls are made of high temperature-tolerant ceramics or metals, the neutral atoms will stick to the walls for a short time, then drift back into the plasma sheath. However, the atoms reentering the plasma sheath from the walls are now quite cold in comparison to the plasma sheath, thus they cause considerable cooling of the plasma in the sheath. Normally, the plasma sheath is cooler than the plasma core, but if the sheath is cooled too much, the differential in temperature between the plasma core and the sheath increases the instability of the plasma. Lithium on the inside wall of the reactor tends to absorb and not release neutral atoms that drift into it. By absorbing and holding the neutral atoms that contact the walls, the lithium prevents the atoms from getting back into the plasma sheath as cold atoms, which helps the sheath to stay warmer and makes the overall plasma more stable.

Currently, in experiments, liquid lithium is drizzled down the inside of the side walls of the reactor vessel from channels that lie just above where the side walls are nearly vertical (i.e. the channels lie just above the "equator" or midsection of the torus reactor vessel). Because of gravity, the liquid lithium does not stay in place, but rather runs down the side walls of the vessel from the channels, and is collected by other channels and drains that lie farther down in the vessel that remove the lithium. This particular method is able to coat the side walls of the vessel from the equator of the reactor to most of the way down to its bottom because gravity causes the lithium to flow down from the channels to the bottom of the reactor. But, this method clearly is not able to coat the side walls that are above the equator of the vessel. In the lowest parts of reactors, liquid lithium has also been used in pools and on coarse horizontal screens, neither of which method can be effectively applied to the upper walls. The disclosed system allows for liquid lithium to be maintained on the surface of all the inner walls of the reactor vessel.

An additional advantage of the use of lithium on the reactor walls is that it is a low atomic number (low-Z) material. If high atomic number (high-Z) materials, such as iron from steel in reactor walls, enter into the plasma, their atoms can become electronically excited by absorbing kinetic energy from ions in the plasma. Typically, the excited high-Z materials lose their extra energy by radiating it as electromagnetic energy (photons). The plasma is transparent to most wavelengths of electromagnetic energy; thus, most photons emitted by excited high-Z materials escape from the plasma and are absorbed by the reactor walls. The net effect is an overall energy loss from the plasma and is called radiative cooling. The plasma gets colder and the reactor walls get hotter. That is the opposite of what is needed to maintain the fusion power reactions. Low-Z materials, such as lithium, have so few electrons that they have very few ways in which they can radiate energy, therefore, low-Z materials cause relatively little radiative cooling of the plasma.

A further advantage to the use of lithium on the insides of fusion reactor walls is that one of the two elements of reactor fuel, tritium, is very rare naturally, but can be made efficiently by exposing lithium to the flux of high energy neutrons produced by the fusion reactor. Thus, if lithium can be placed in regions of the reactor close to the plasma where the neutron flux is most intense, the production of tritium from the lithium can be efficient. Because of liquid lithium's tendency to hold on to atoms of other materials in it, cycling the lithium through the reactor provides an effective way to introduce pure lithium into the reactor, produce tritium in the lithium, and remove the tritium from the reactor by pumping the tritiated lithium back out of the reactor and passing it through a chemical processing system that extracts the tritium from the lithium, thus providing tritium to fuel the reactor and clean lithium ready to be cycled once more through the reactor.

The system of the present disclosure utilizes a porous, open-cell material that is capable of retaining liquid lithium in place on reactor vessel walls against gravity and electromagnetic forces. In addition, this material allows for the liquid lithium to be slowly pumped throughout the system in order to absorb contaminants from the plasma. During operation of the disclosed system, clean lithium is first pumped into the system to the inner surfaces of the reactor walls, where the lithium is exposed to the plasma. In that location, the clean lithium absorbs contaminants from the plasma. The contaminated lithium is then removed from the reactor, and is processed to remove the plasma contaminants from the lithium. After the contaminants are removed from the lithium, the cleaned lithium is re-circulated back into the system.

Liquid lithium surfaces exposed to the plasma inside experimental tokamaks and other types of fusion energy experimental devices have been shown to help stabilize the plasma and to help the plasma maintain its high internal temperature. However, it should be noted that these reactor vessels typically are constructed to have very complex shapes as well as having many discontinuities and openings for various items, such as for instruments, vacuum pumping ports, and magnetic coils. Currently, no effective methods have been proposed for retaining liquid lithium on the inside of the reactor vessel walls that accommodates all the discontinuities and openings, and which retains the lithium against the effects of gravity and electromagnetic forces. The present disclosure teaches a method which can accommodate discontinuities, and which keeps slowly flowing liquid lithium in place on reactor walls regardless of the orientation of the reactor wall surface, and the effects of gravity and electromagnetic forces.

To date, experiments with liquid lithium adjoining fusion plasmas have been more focused on the effect of lithium on the plasma than on how to build a liquid lithium wall. Five types of ad hoc approaches have been used to facilitate liquid lithium-hydrogen plasma interaction experiments. These five approaches are: (1) pools of liquid lithium placed in trays at the bottom of the toroidal reactor vessel, (2) metal screens wetted with liquid lithium that are placed horizontally at the bottom of the vessel, (3) a band placed about the mid-plane of the reactor vessel has liquid lithium flowing down its inner surface from the top of the band to the bottom of the band, (4) confining the plasma in spherical and cylindrical reactor vessels that are physically rotated so as to cause the liquid lithium to continually recoat the inner surface walls of the vessel from a pool at the bottom of the vessel, and (5) coating part of the vertical portion of the inside of the reactor vessel with a porous metal, which may be deposited for example by flame or plasma spraying, and pumping molten lithium through the porous metal.

The first two listed approaches have limitations of only producing lithium surfaces for a small area in the bottom of the reactor. The third approach only coats a band about the middle of the reactor, and requires high flow rates to keep the surface of the band coated. High flow rates increases the pumping power required to operate the reactor, which subtracts from any energy the reactor might produce. The fourth approach is not being easily being employed by a toroidal vessel, which has the most effectively shaped magnetic fields for containing plasmas. Continually rotating the walls of a toroidal vessel is impossible because of the rigid materials used for the construction of these vessels. In addition, the fourth approach requires portions of the inside of the reactor vessel to constantly move, which interferes with the placement and the use of other devices that must be present within the vessel wall, such as vacuum pumping ports, sensors, and magnetic coils. The fifth approach has the drawbacks of having little control over where the lithium flows, the fact that porous metal is a high-Z material, and the fact that the use of large areas of porous metal precludes having any control over electrical current flows on the inner surface of the reactor.

The present disclosure employs tiles manufactured from high-temperature, open-cell sponge-like material (e.g., the Boeing Rigid Insulation (BRI) material) to retain liquid lithium in place against gravity and electromagnetic forces, and to allow for the liquid lithium to be slowly pumped throughout the system in order to remove contaminants from the plasma. There are multiple advantages to this approach. A first advantage is that the tiles can be manufactured to be small in size so that the inside of the toroidal vessel can be tiled with a mosaic of liquid lithium filled tiles despite the complex shape of the inside of the reactor vessel. A second advantage is that the material of the tiles (e.g., a porous ceramic material with open cells) is resistant to the high temperatures to which the tiles will be exposed to when the plasma is present inside of the reactor vessel. A third advantage is that the material of the tiles (e.g., porous a ceramic material with open cells) is resistant to the corrosive effects of lithium. A fourth advantage is that the construction of the tiles can be tailored to produce pore sizes and/or open channels that are optimal to the retention and flow of liquid lithium.

In addition, a fifth advantage is that, if plasma disruptions cause the plasma to impact the tiles so intensely that the outer surface of lithium boils away, the high permeability of the tiles will allow more lithium to wick to the surface of the tile. A sixth advantage is that, in the event that some of the tile itself is removed by a plasma impact, the depth of the tile will allow for the tile to continue to function and, thus, several plasma impacts on a tile can be tolerated before the tile would need to be replaced. A seventh advantage is that, in the event that part of a tile is ablated by the plasma, the materials that the tile is manufactured from are mostly of low nuclear weight elements, which will have a less adverse effect on the plasma than materials of high weight metals. An eighth advantage is that, in the event that a portion of a tile is ablated, the portion of the tile that is ablated will simply be an empty space filled with liquid lithium. As such, it is evident that the use by the disclosed system of tiles, which are manufactured from a high-temperature, porous material, to retain liquid lithium on the reactor vessel walls has many beneficial advantages.

In fusion energy experiments, electric coils producing modulated magnetic fields, that are installed facing the plasma, have been shown to be helpful in controlling instabilities in the plasma. However, it should be noted that fusion power reactors will have internal environments so severe that placing electrical coils near the plasma is likely impractical. As alluded to above, molten lithium has been shown in experiments to be one material that is able to face the plasma. In one or more embodiments of the present disclosure, instead of employing electrical coils facing the plasma, an electric charge is applied to the liquid lithium, which faces the plasma, in order to aid in controlling instabilities in the plasma. In some embodiments, electric coils are installed behind the structures containing the liquid lithium to work in conjunction with the electrically charged liquid lithium to help in controlling instabilities in the plasma.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
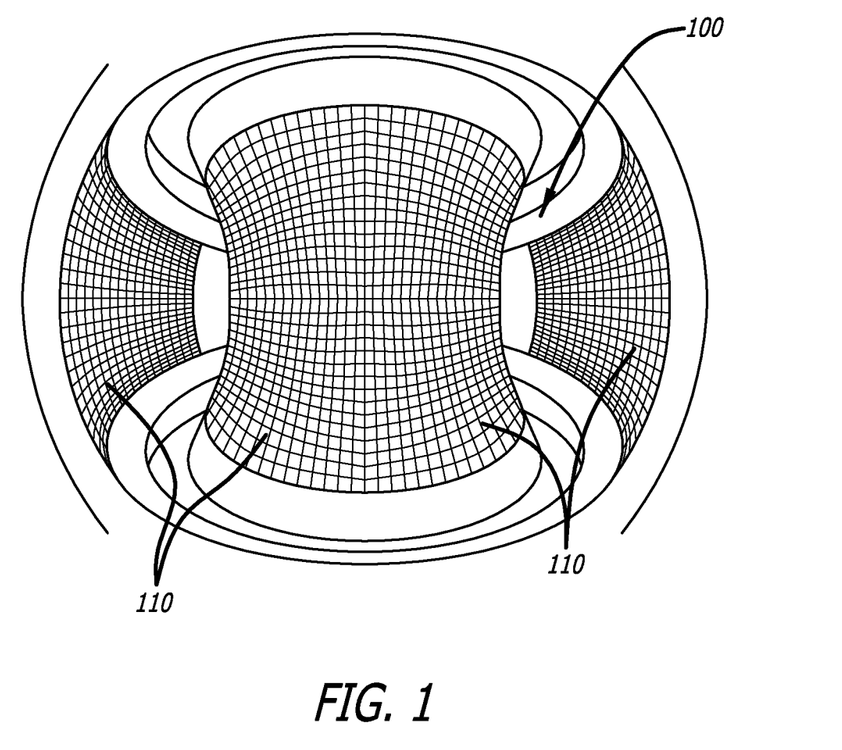
FIG. 1 is an illustration of the interior of a toroidal fusion power reactor, in accordance with at least one embodiment of the present disclosure.

FIG. 1 is an illustration of the interior of a fusion power reactor 100, in accordance with at least one embodiment of the present disclosure. In this figure, it can be seen that the fusion power reactor 100 is of a torus shape. It should be noted that the system of the present disclosure can be used with various different types and shapes of fusion power reactors. The first wall of the fusion power reactor 100 is lined with small tiles 110 that are each manufactured from a high temperature-tolerant, porous material. These small tiles 110 allow for liquid lithium to coat the surface of the walls of the reactor vessel 100. The liquid lithium helps to stabilize the plasma in the reactor vessel 100, and helps the plasma maintain its high internal temperature.

Figure 2:
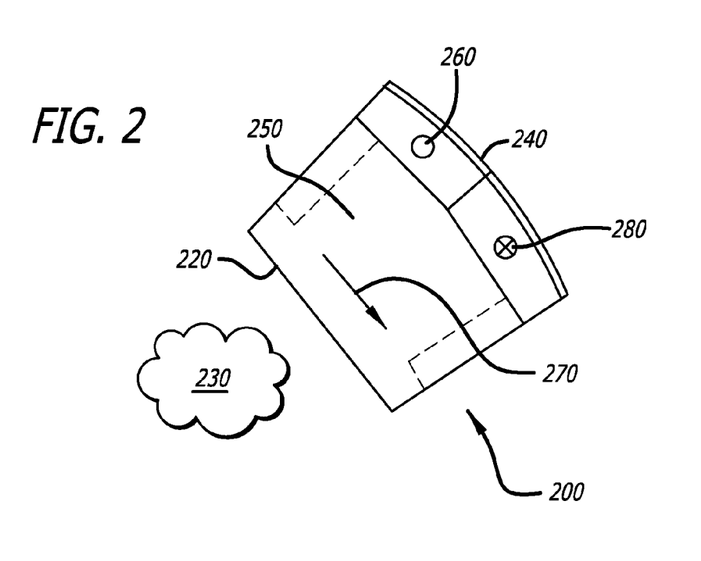
FIG. 2 shows a top view of a single tile for maintaining liquid lithium on the surface area of the internal walls of a reactor chamber, in accordance with at least one embodiment of the present disclosure.

FIG. 2 shows a top view of a single tile 200 for maintaining liquid lithium on the surface area of the internal walls of a reactor chamber, in accordance with at least one embodiment of the present disclosure. The tile 200, which is manufactured from a high-temperature-resistant, porous material with open cells, is installed onto the reactor vessel wall 240. In this figure, the tile 200 is shown to include an input plenum 260 and an output plenum 280. Both the input plenum 260 and the output plenum 280 are a single hollow piece of non-porous material (e.g., a metal).

During operation of the system, clean liquid lithium is inputted into the tile 200 through the input plenum 260. The liquid lithium is flowed into the input plenum 260 of the tile 200 via pressure being applied at the input plenum 260 and/or a vacuum being present at the output plenum 280. Various types of pumps may be employed by the system for applying pressure at the input plenum 260 of the tile 200 including, but not limited to, a propeller pump, a centrifugal pump, and a piston pump. The clean liquid lithium circulates within the interior network of open cells or channels throughout the body 250 of the tile 200. The clean liquid lithium seeps through the open cells of tile 200 to reach the porous external surface 220 of the tile 200 that faces the interior cavity of the reactor vessel, which contains the hot, tenuous plasma 230. The direction of the flow of the liquid lithium within the body 250 of the tile 200 is denoted by arrow 270.

The clean liquid lithium that lies on the porous external surface 220 of the tile 200 absorbs contaminants from the plasma 230. This newly contaminated liquid lithium is then removed from the tile 200 via the output plenum 280. After the contaminated liquid lithium is removed from the tile 200, the liquid lithium is processed to remove the contaminants from the liquid lithium. The resulting cleaned liquid lithium is then re-circulated back into the system.

It should be noted that in alternative embodiments, the tile 200 may not specifically include an input plenum 260 and/or an output plenum 280 as is depicted in FIG. 2, but rather may have at least one open cell or channel in its interior for the liquid lithium to be inputted into the tile 200 and/or to be outputted from the tile 200.

Figure 3:
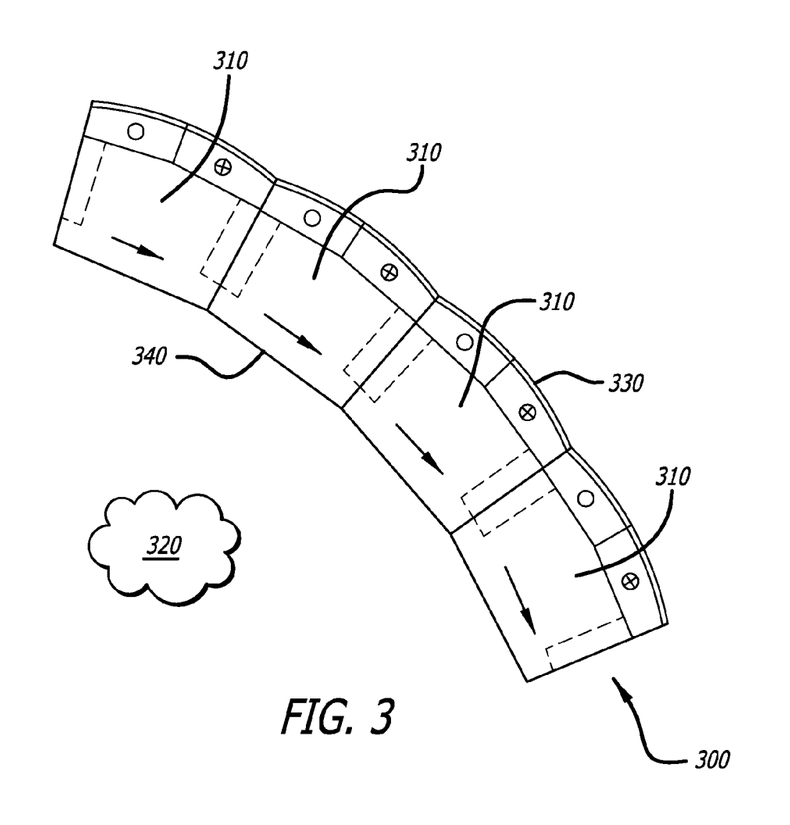
FIG. 3 illustrates a top view of a configuration of four of the tiles of FIG. 2 that are installed next to one another, in accordance with at least one embodiment of the present disclosure.

FIG. 3 illustrates a top view of a configuration 300 of four of the tiles 310 of FIG. 2 that are installed next to one another, in accordance with at least one embodiment of the present disclosure. In this figure, it is shown that the tiles 310 are able to be installed adjacent to one another along the curved surface of the reactor vessel wall 330. When the tiles 310 are installed in this configuration, the porous external surface 340 of the tiles 310 that faces the interior cavity of the reactor vessel containing the plasma 320 is shown to form a curved surface area.

Figure 4:
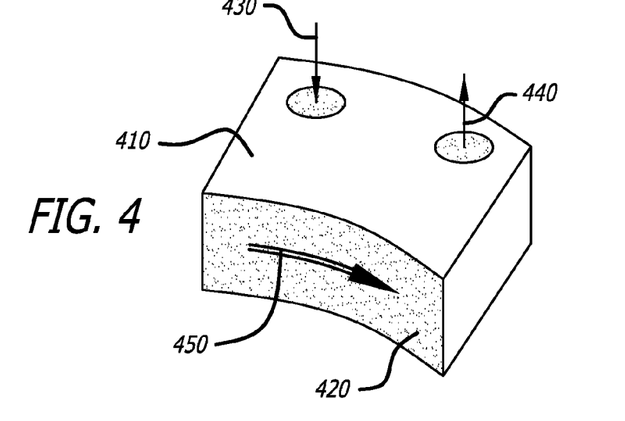
FIG. 4 depicts a cross-sectional side view of a tile for maintaining liquid lithium on the surface area of the internal walls of a reactor chamber that has a uniform porosity, in accordance with at least one embodiment of the present disclosure.

FIG. 4 depicts a cross-sectional side view of a tile 410 for maintaining liquid lithium on the surface area of the internal walls of a reactor chamber that has a uniform porosity, in accordance with at least one embodiment of the present disclosure. In this figure, the tile 410 is shown to have an input plenum 430 and an output plenum 440. The tile 410 is also depicted to be manufactured to have a uniform porosity 420. In addition, the direction of the flow of the liquid lithium within the body of the tile 410 is denoted by arrow 450 in this figure.

Figure 5:
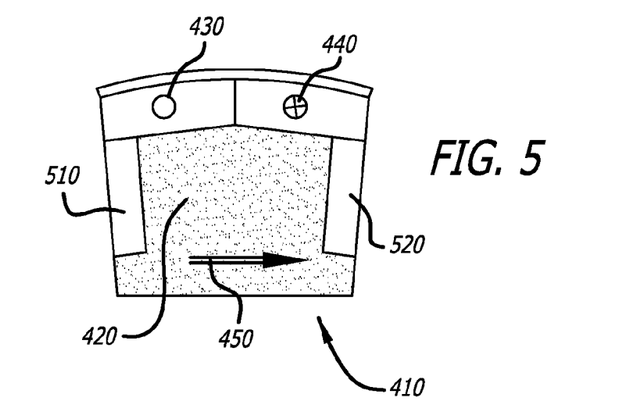
FIG. 5 illustrates a cross-sectional top view of the tile of FIG. 4, in accordance with at least one embodiment of the present disclosure.

FIG. 5 illustrates a cross-sectional top view of the tile 410 of FIG. 4, in accordance with at least one embodiment of the present disclosure. This figure simply shows another cross-sectional view of the tile 410, which has a uniform porosity 420. In addition, it should be noted that, in some embodiments, the borders of the side areas 510, 520 of the tile 410 are manufactured from the same non-porous material that is used to manufacture the input plenum 430 and the output plenum 440.

Figure 6:
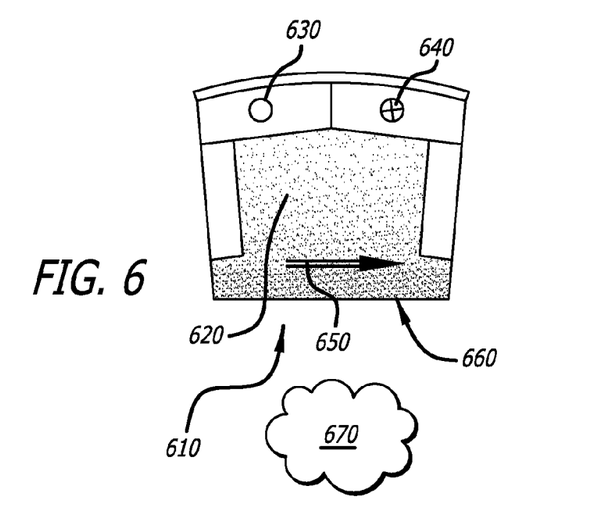
FIG. 6 shows a cross-sectional top view of a tile for maintaining liquid lithium on the surface area of the internal walls of a reactor chamber that has a non-uniform porosity, in accordance with at least one embodiment of the present disclosure.

FIG. 6 shows a cross-sectional top view of a tile 610 for maintaining liquid lithium on the surface area of the internal walls of a reactor chamber that has a non-uniform porosity, in accordance with at least one embodiment of the present disclosure. In this figure, the tile 610 is shown to have an input plenum 630 and an output plenum 640. The tile 610 is illustrated to be manufactured to have a non-uniform porosity 620. In this figure, the porosity of the body of the tile 610 is shown to gradually lessen from the external surface 660 of the tile 610 that faces the plasma 670 to the input and output plenums 630, 640. Also in this figure, arrow 650 illustrates the direction of the flow of the liquid lithium within the body of the tile 610.

Figure 7:
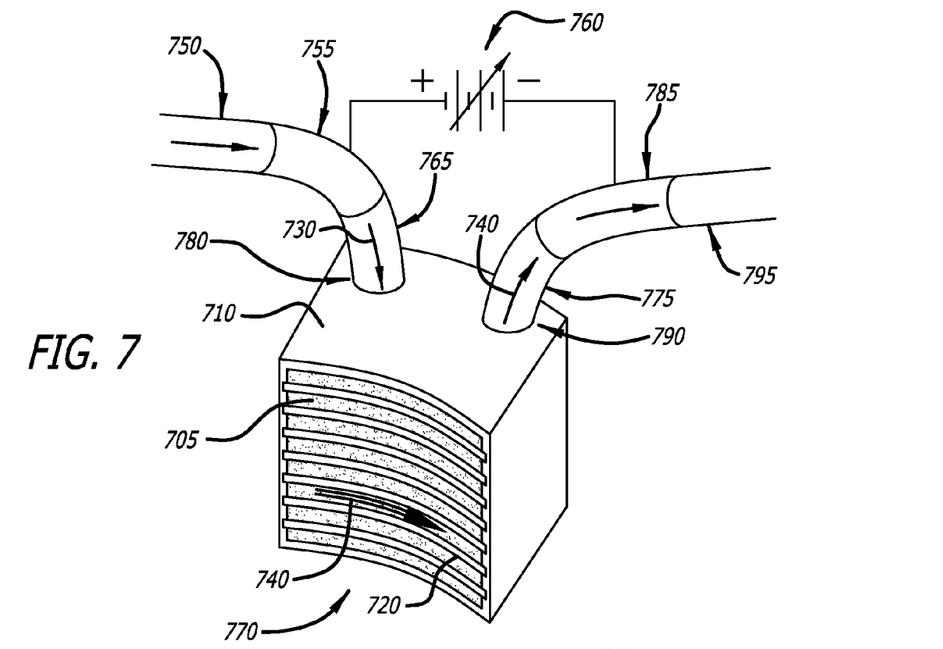
FIG. 7 depicts a cross-sectional side view of a tile for maintaining liquid lithium on the surface area of the internal walls of a reactor chamber, where an electric charge is applied to the liquid lithium and the tile includes channels for the electrically charged liquid lithium to flow, in accordance with at least one embodiment of the present disclosure.

FIG. 7 depicts a cross-sectional side view of a tile 710 for maintaining liquid lithium on the surface area of the internal walls of a reactor chamber, where an electric charge is applied to the liquid lithium, and the tile 710 includes channels 705 for the electrically charged liquid lithium to flow, in accordance with at least one embodiment of the present disclosure. The tile of FIG. 7 differs from the basic tile construction shown in FIGS. 2 and 4 in that the foam region containing the flowing lithium is divided into many narrow channels 705 that are exposed to the plasma 770. In the plasma-facing region, the lithium channels 705 are electrically isolated from each other. At the input to and the output from the plasma-facing region, the channels 705 are physically connected together, which makes them electrically and hydraulically in parallel. In alternative embodiments, the channels 705 can have electrically isolated "return" channels that are built deeper into the tile 710, which allows for the plasma-facing channels 705 to be electrically and hydraulically in series.

The basic tile construction of FIG. 4 consists of a monolithic foam tile 410 that can be manufactured from an electrically conductive (e.g. metal) foam or an electrically insulating (e.g. ceramic) foam through which the liquid lithium will flow. For the tile 710 of FIG. 7, the plasma-facing portion of the tile 710 is divided into channels 705 through which the liquid lithium will flow, and which are electrically isolated from each other. There are several ways that the electrically isolated channels 705 can be manufactured in the tile 710. A first way is that the tile 710 surface is manufactured to have regions of ceramic or metal foam strips 705 through which the lithium will flow. These regions 705 are hydraulically and electrically separated by solid ceramic strips 720, which are able to electrically insulate the lithium channels 705 from each other and which exclude the electrically conductive lithium from their interiors.

A second way that the electrically isolated channels 705 can be manufactured in the tile 710 is that, similar to the first way, the tile 710 surface is manufactured to have regions of ceramic or metal foam strips 705 through which the lithium will flow. These regions 705 are separated by ceramic foam strips 720 that have been treated to prevent the penetration of lithium into them. The treatment must itself be electrically insulating. By preventing the penetration of lithium into the treated region, and by maintaining the insulating properties of the ceramic, the treatment allows the strips 720 to electrically and hydraulically insulate the lithium channels 705 from each other.

A third way that the electrically isolated channels 705 can be manufactured in the tile 710 is that the tile 710 surface is manufactured completely from ceramic foam. In the foam, narrow strips 720 are be treated with a lithium-blocking, nonconductive coating, which will prevent liquid lithium from wetting and, thus, penetrating those regions. Liquid lithium will flow freely in the untreated strips 705 between the treated strips 720.

The reason for confining the lithium to thin electrically and hydraulically isolated strips 705 is to produce an array of parallel "wires" of liquid lithium on the surface of the tile 710. The wires 705 will have a voltage applied across them so that the lithium channels 705 will carry electric currents in the well defined regions and directions. This channel configuration allows for the currents in the lithium to produce a controlled magnetic field in the plasma 770 adjacent to the tile 710.

In FIG. 7, the tile 710 is shown to be attached to some form of plenums 780, 790 or plumbing that provide the input 730 and output 740 of the lithium of the tile 710. The input plumbing 780 and output plumbing 790 are part of an electrical circuit because they are each connected to a voltage source 760. As such, the input plenum 780 and the output plenum 790 are manufactured to be electrically insulated from each other and their surroundings.

During operation, the liquid lithium, which has been thermally conditioned, is collected in an electrically insulated reservoir (not shown). The lithium is then pumped from the reservoir either by a pump (not shown) into the input plumbing 780 from the reservoir or by pressurizing the gas in the space above the lithium in the reservoir. The initial portion 750 of the input plumbing 780 must be electrically insulated from the outside world, or manufactured from an insulating material, such as ceramic tubing. At some point in the hydraulic path to the tile 710, a section 755 of the input plumbing 780 is manufactured of a conductive material, such as metal, and is electrically connected to an electrical power supply 760 (e.g., a variable voltage supply 760 as shown in this figure). The electrical power supply 760 will supply the electric current input for the lithium. From the electrical start point, the final portion 765 of the input plumbing 780 is insulated, and will carry the liquid lithium to the inside of the tile 710.

After flowing into the tile 710, the liquid lithium will flow in the parallel channels 705 of the tile 710. The direction of the flow of the liquid lithium within the channels 705 is denoted by arrow 740 in this figure. The liquid lithium will then enter into the return plumbing 790. That plumbing 790 will mostly be insulated (i.e. regions 775 and 795), but will have one conductive section 785, which will be connected to the return path of the electric circuit (i.e. connected to the other end of the electrical power supply 760). If the electrical return point is at facility ground potential, the lithium can then flow on to any heat exchangers or filtering/cleaning processes that will be needed before the lithium can re-enter into the input reservoir (not shown). The lithium re-entering the input reservoir will need to enter by some means, such as dripping, so that the entering lithium, which will be at electrical ground potential, will not form an electrically conductive path between the entrance to the reservoir at ground potential and the liquid lithium in the bottom of the reservoir, which will be at the electrical potential of the input to the tile 710. A pneumatic process that inserts insulating barriers (i.e. bubbles) in lithium flowing in an insulating pipe could also possibly provide electrical isolation between the incoming and outgoing lithium similar to that provided by dripping, as long as the lithium does not wet the walls of the insulating pipe.

If the electrical return point is not at facility ground potential, such as what would be the case if the lithium electrical circuit operates from a voltage above ground at the input and a voltage below ground at the return, then the lithium leaving the electrical return point must also go through some process, such as dripping, which will electrically isolate the returning lithium from the heat exchangers and filtering or cleaning equipment. In this system, after conditioning, the lithium, which will be at facility ground potential must go through electrical isolation again before reaching the bottom of the input reservoir, just as it did in the previous approach.

Returning to the lithium-containing tile 710 itself, it should be noted that this particular tile 710 design has three key features. The first key feature of this design is that because of the geometry of the lithium-filled regions 705 (i.e. the channels 705) and the lithium-free regions 720, electric currents impressed on the lithium circuit are forced to all flow either in parallel or anti-parallel to the flow of the lithium itself, depending upon the polarity of the impressed voltage. The second key feature of this design is that by placing a series of tiles 710 in a closed ring on the surface of the plasma-facing wall of a reactor, the sum of the local magnetic fields produced by all the electrical currents in the tiles 710 will produce a large net magnetic field, which can be used to manipulate the plasma 770. The third key feature of this design is that if the tiles 710 are placed between a plasma control electromagnet (e.g., an electromagnetic coil) and the plasma 770 (refer to FIGS. 10, 11, and 12), the surface electrical current paths in the tiles 710 are aligned with the currents in the plasma control magnet, and the surface electrical currents in the tiles 710 and the electrical currents in the magnet are in parallel, then the electrical currents in the liquid lithium will enhance the magnetic field produced by the plasma control magnet; whereas, without the controlled, externally driven electrical currents in the liquid lithium, the conductive liquid lithium would support local electrical currents that would respond to, but oppose, changes in the current flow in the plasma control magnet.

Figure 8:
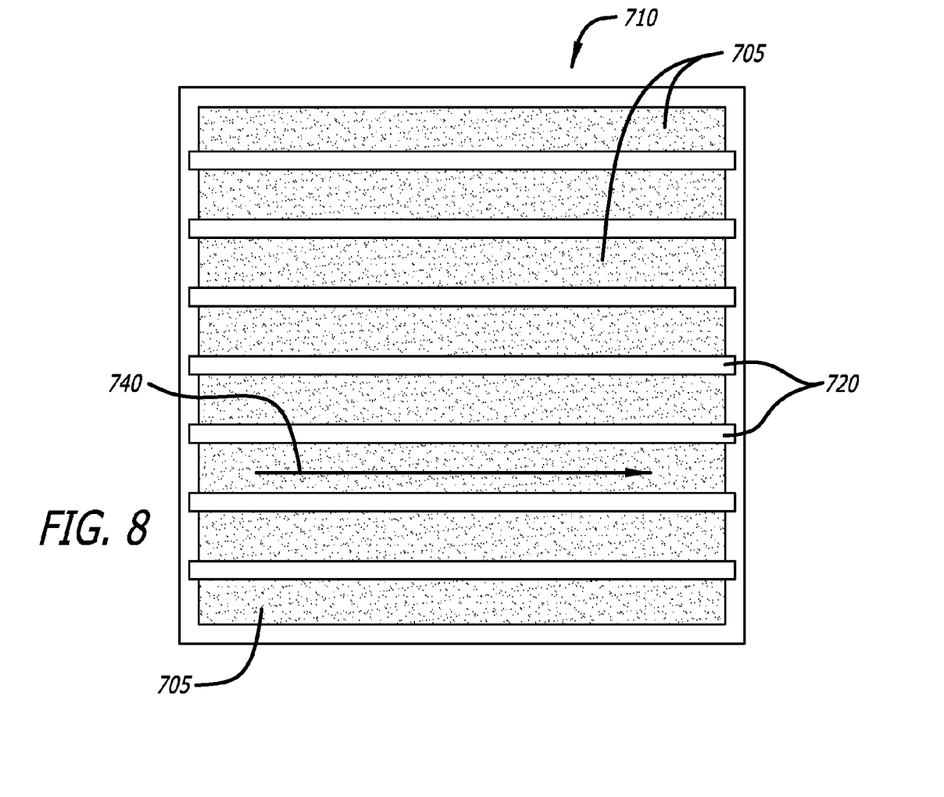
FIG. 8 depicts a side view of the tile of FIG. 7 illustrating the channels, in accordance with at least one embodiment of the present disclosure.

FIG. 8 depicts a side view of the tile 710 of FIG. 7 illustrating the channels 705, in accordance with at least one embodiment of the present disclosure. In this figure, the channels 705 are shown to be isolated by thin strips 720. The liquid lithium flows in the channels 705 in a direction that is denoted by arrow 740.

Figure 9:
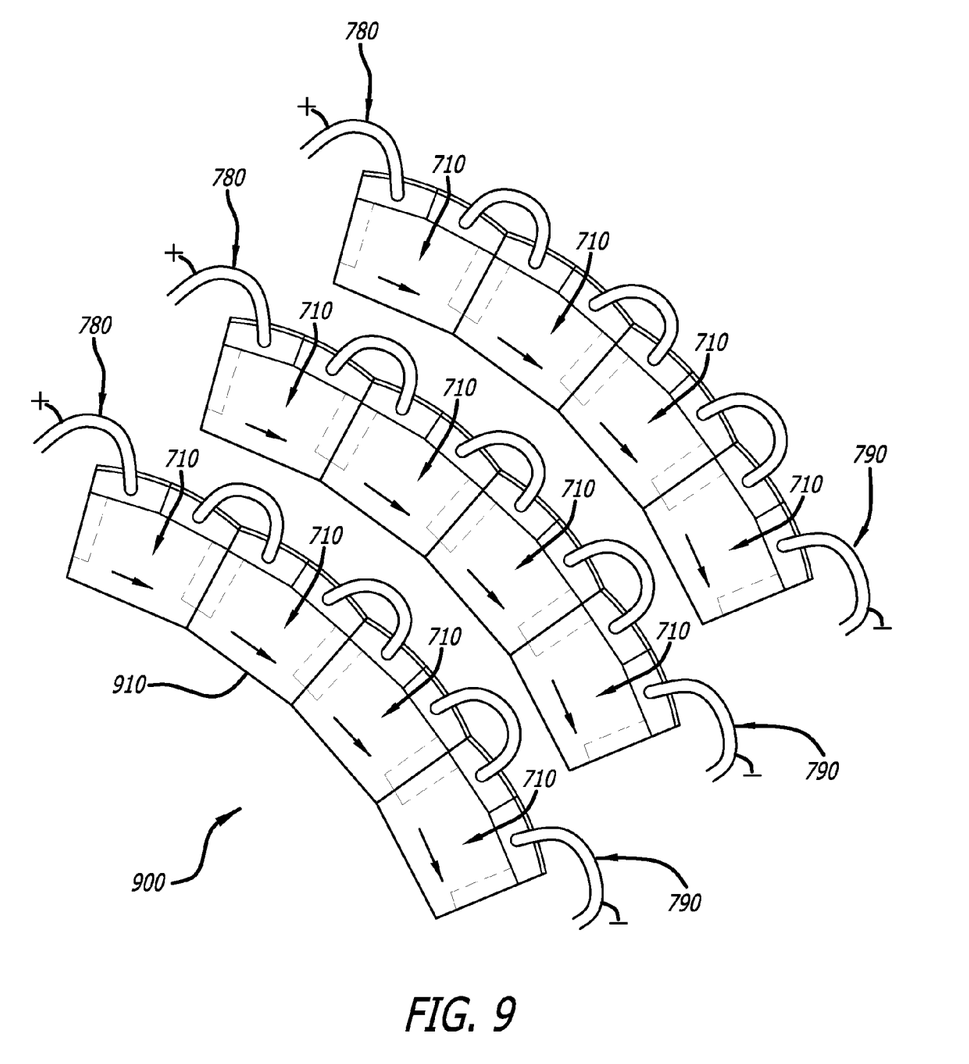
FIG. 9 illustrates a top view of a configuration of three rows of four of the tiles of FIG. 7 that are installed next to one another, in accordance with at least one embodiment of the present disclosure.

FIG. 9 illustrates a top view of a configuration 900 of three rows of four of the tiles 710 of FIG. 7 that are installed next to one another, in accordance with at least one embodiment of the present disclosure. In this figure, it is shown that the tiles 710 are able to be installed adjacent to one another in a row along the curved surface of the reactor vessel wall. When the tiles 710 are installed in this configuration, the porous external surface of the tiles 710 that faces the interior cavity of the reactor vessel containing the plasma 770 is shown to form a curved surface area 910.

In one or more embodiments of the present disclosure, multiple rows of the tiles 710 may be installed on the surface area of the internal walls of the reactor chamber. The tiles 710 may be connected hydraulically and electrically in series, as is shown for each row of tiles 710 in FIG. 9, in which the output plumbing of one tile 710 connects to the input plumbing of another tile 710, and one end of each row of the tiles 710 is shown to be connected to a positive terminal of a power supply (not shown) via input plumbing 780, and the opposite end of each row of the tiles 710 is shown to be connected to a negative terminal of the power supply (not shown) via return plumbing 790. It should be noted that in alternative embodiments, each of the tiles 710 in a row may be connected to a separate dedicated power supply for that particular tile 710. How many tiles could be connected in series would depend upon a trade-off among the pressures needed to pump the lithium, the voltages needed to drive the needed electrical current through the lithium, and the ease or difficulty of access to the lithium tiles 710 for plumbing and electrical connections.

Figure 10:
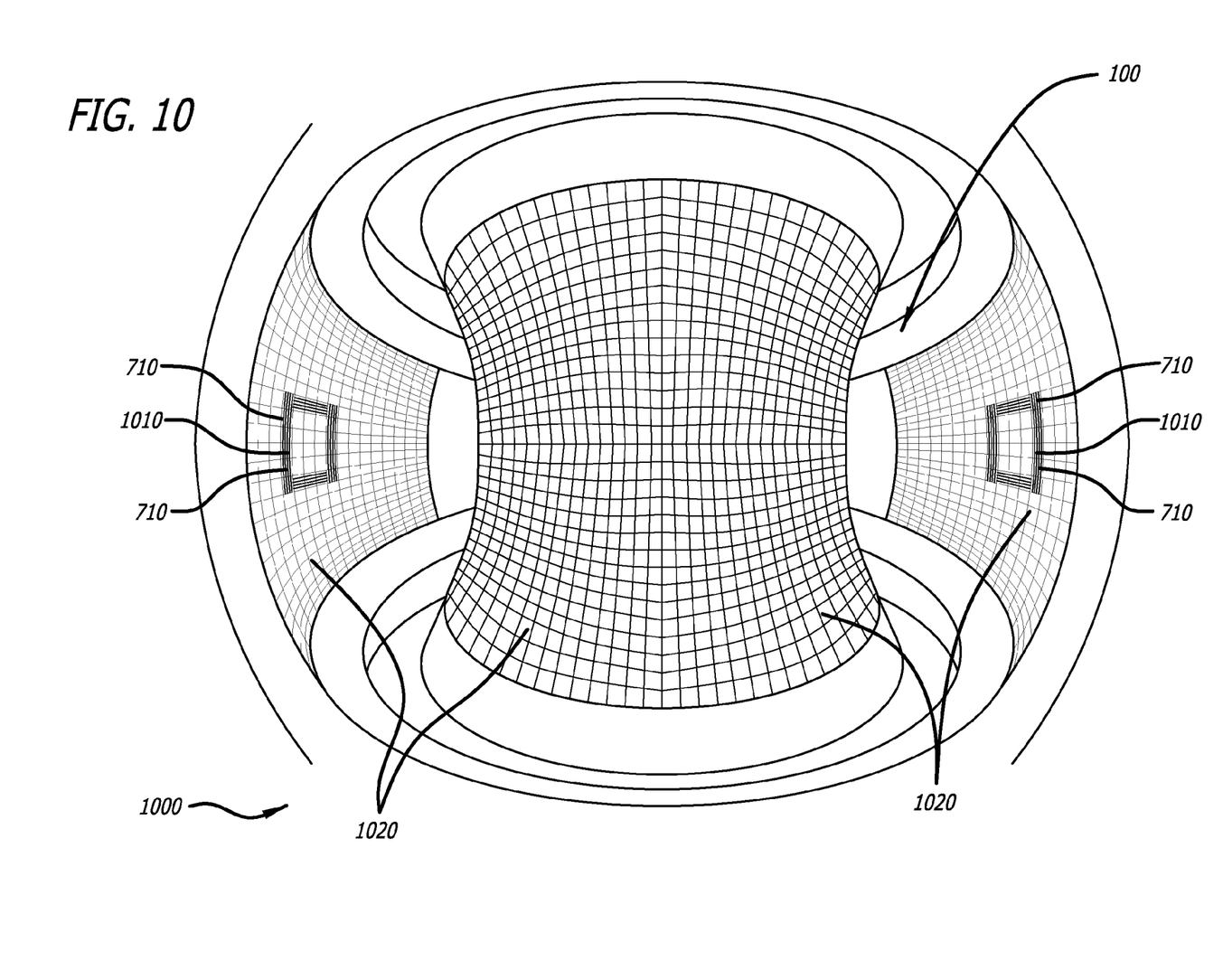
FIG. 10 is an illustration of the interior of a toroidal fusion power reactor that includes two magnetic coils mounted behind the tiles of FIG. 7, in accordance with at least one embodiment of the present disclosure.

FIG. 10 is an illustration of the interior of a toroidal fusion power reactor 100 that includes two magnetic coils 1010 mounted behind the tiles 710 of FIG. 7, in accordance with at least one embodiment of the present disclosure. As previously mentioned, electric coils 1010 installed behind tiles 710 containing electrically charged liquid lithium work in conjunction with the electrically charged liquid lithium to help in controlling instabilities in the plasma. The electric coils 1010 may be manufactured from various different materials including, but not limited to, copper alloy materials. In this figure, the tiles 1020 are shown to not have a magnetic coil 1010 mounted behind them.

Figure 11:
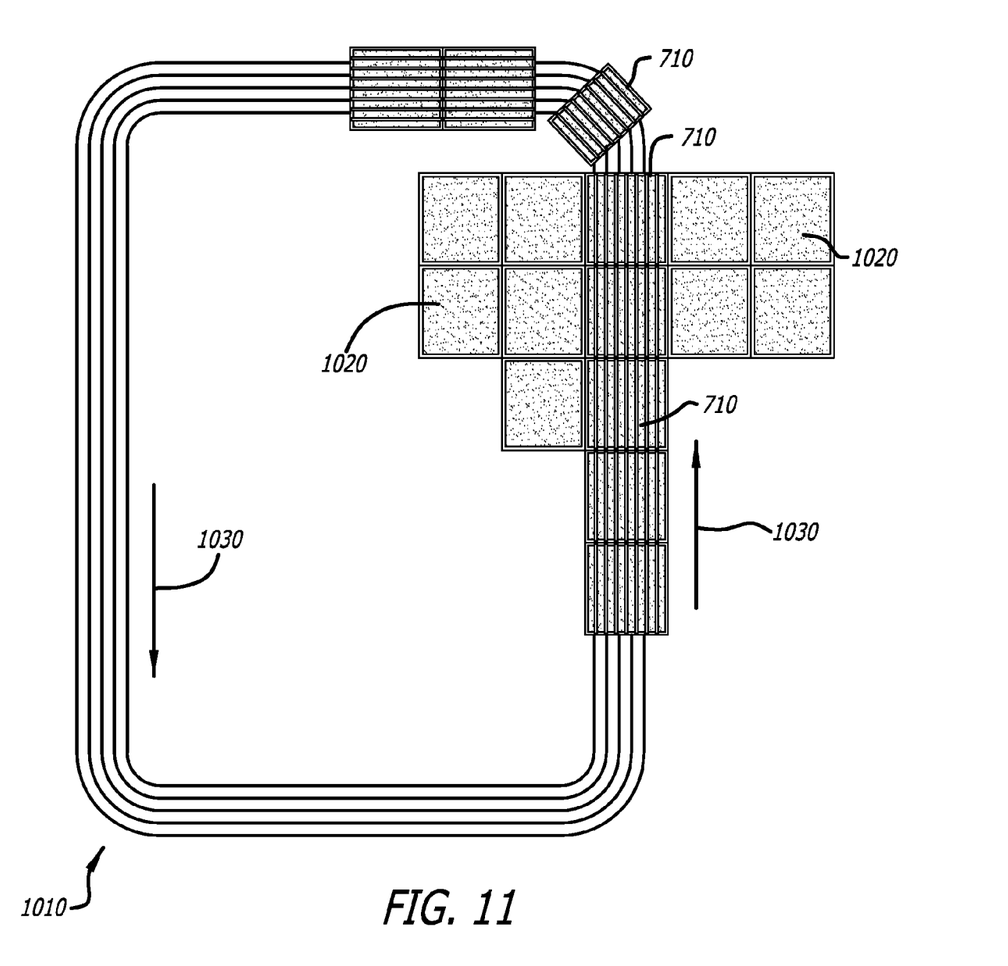
FIG. 11 shows a close-up view of one of the magnetic coils of FIG. 10 depicted along with a number of tiles, in accordance with at least one embodiment of the present disclosure.

FIG. 11 shows a close-up view of one of the magnetic coils 1010 of FIG. 10 depicted along with a number of tiles 710, 1020, in accordance with at least one embodiment of the present disclosure. In this figure, the magnetic coil 1010 is shown to be installed behind a number of tiles 710 with channels 705 that contain electrically charged liquid lithium. The direction of the electrical current flow of the magnetic coil 1010 is denoted by arrows 1030. In this figure, the tiles 1020 that do not have the magnetic coil 1010 installed behind them are shown to be the type of tile 410 of FIG. 4, which does not include channels 705. However, it should be noted that in other embodiments, the tiles 1020 that do not have a magnetic coil 1010 installed behind them may be the type of tile 410 of FIG. 4, which does not include channels 705, and/or the type of tile 710 of FIG. 7, which does include channels 705.

Figure 12:
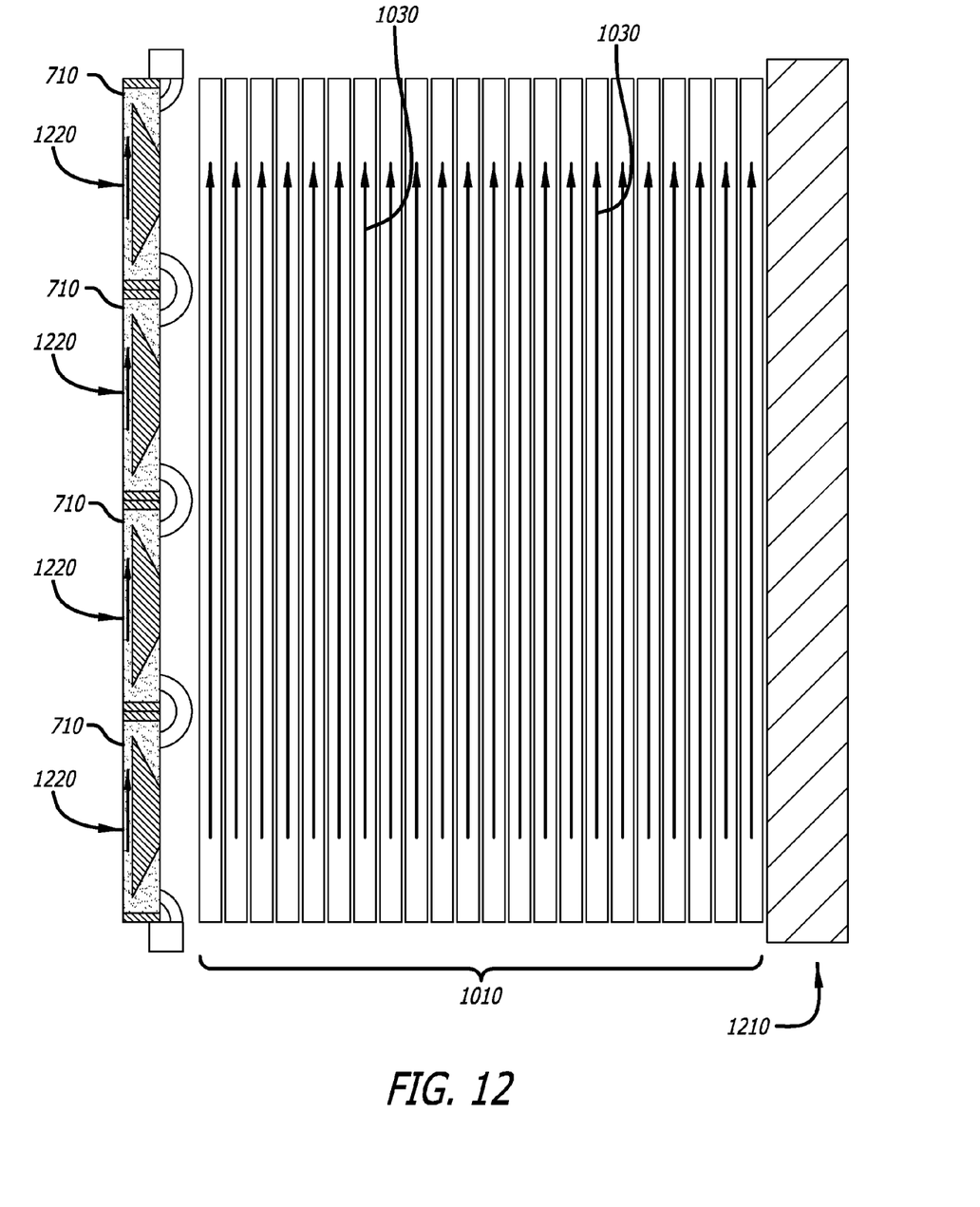
FIG. 12 shows a cross-sectional top view of the magnetic coil of FIG. 11, in accordance with at least one embodiment of the present disclosure.

FIG. 12 shows a cross-sectional top view of the magnetic coil 1010 of FIG. 11, in accordance with at least one embodiment of the present disclosure. In this figure, the magnetic coil 1010 is shown to be installed in between a number of tiles 710, which include channels 705, and the internal wall 1210 (e.g., a steel alloy wall) of the reactor chamber. The direction of the electric current of the liquid lithium within the channels 705 of the tiles 710 is denoted by arrows 1220, and the direction of the current flow of the magnetic coil 1010 is denoted by arrows 1030.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for maintaining liquid lithium on a surface area of internal walls of a reactor chamber, the method comprising:
   installing at least one layer of at least one porous open-cell tile on the surface area of the internal walls of the reactor chamber,
   wherein a portion of the at least one tile facing an interior of the reactor chamber is divided into a plurality of channels; and
   applying an electric charge to the liquid lithium;
   flowing the liquid lithium into an interior network of open cells of the at least one tile;
   circulating the liquid lithium through the interior network of the at least one tile via at least one of the open cells to allow for the liquid lithium to seep from the interior network of the open cells to the channels on an external surface of the at least one tile that faces the interior of the reactor chamber; and
   outputting the circulated liquid lithium from the at least one tile.

2. The method of claim 1, wherein the interior network of the at least one tile and the channels of the at least one tile are manufactured from a high-temperature resistant, porous open-cell material.

3. The method of claim 2, wherein the high-temperature resistant, porous open-cell material is a ceramic foam, and wherein the channels are hydraulically and electrically separated from one another.

4. The method of claim 1, wherein the at least one tile is manufactured from a high-temperature resistant, porous open-cell material.

5. The method of claim 1, wherein the method further comprises installing at least one magnetic coil between the at least one tile and the surface area of the internal walls of the reactor chamber.

6. The method of claim 1, wherein at least one voltage source is used to provide the electric charge.

7. The method of claim 1, wherein the at least one tile has a constant porosity.

8. The method of claim 1, wherein the at least one tile includes an input plenum,
wherein the liquid lithium is inputted into the at least one tile via the input plenum.

9. The method of claim 8, wherein the input plenum is a hollow piece of metal.

10. The method of claim 1, wherein the at least one tile includes an output plenum,
wherein the liquid lithium is outputted from the at least one tile via the output plenum.

11. The method of claim 10, wherein the output plenum is a hollow piece of metal.

12. The method of claim 1, wherein a flow rate of the circulation of the liquid lithium within the interior network of the at least one tile is varied over time.

13. A system for maintaining liquid lithium on a surface area of internal walls of a reactor chamber, the system comprising:
at least one porous open-cell tile, wherein a portion of the at least one tile facing an interior of the reactor chamber is divided into a plurality of channels; and
the reactor chamber, wherein at least one layer of the at least one tile is installed on the surface area of the internal walls of the reactor chamber,
wherein the at least one tile allows for electrically charged liquid lithium to be flowed into an interior network of open cells of the at least one tile,
wherein the at least one tile further allows for the liquid lithium to be circulated throughout the interior network of the at least one tile via at least one of the open cells to allow for the liquid lithium to seep from the interior network of the open cells to the channels on an external surface of the at least one tile that faces the interior of the reactor chamber, and
wherein the at least one tile further allows for the circulated liquid lithium to be outputted from the at least one tile.

14. A tile for maintaining liquid lithium on a surface area of internal walls of a reactor chamber, the tile comprising:
a high-temperature resistant, porous open-cell material;
a plurality of channels; and
an interior network of open cells in an interior of the tile for circulating electrically charged liquid lithium within the interior network of the tile via at least one of the open cells to allow for the liquid lithium to seep from the interior network of the open cells to the channels on an external surface of the at least one tile that faces an interior of the reactor chamber.

* * * * *